United States Patent
Xiang

(10) Patent No.: US 9,350,178 B2
(45) Date of Patent: May 24, 2016

(54) DEVICE AND METHOD FOR PROTECTING RECHARGEABLE POWER SUPPLY OF ELECTRONIC CIGARETTE

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 491 days.

(21) Appl. No.: 13/869,713

(22) Filed: Apr. 24, 2013

(65) Prior Publication Data

US 2014/0253020 A1 Sep. 11, 2014

(30) Foreign Application Priority Data

Mar. 5, 2013 (CN) .......................... 2013 1 0069937

(51) Int. Cl.
  *H02J 7/00* (2006.01)
(52) U.S. Cl.
  CPC ............. *H02J 7/0029* (2013.01); *H02J 7/0031* (2013.01)
(58) Field of Classification Search
  USPC ........................................................ 320/107
  See application file for complete search history.

(56) References Cited

U.S. PATENT DOCUMENTS

| | | | |
|---|---|---|---|
| 2012/0160251 A1* | 6/2012 | Hammel | A24F 1/28 131/191 |
| 2013/0015824 A1* | 1/2013 | Newton | H02J 7/0034 320/165 |

* cited by examiner

*Primary Examiner* — Robert Grant
(74) *Attorney, Agent, or Firm* — Tim Tingkang Xia, Esq.; Locke Lord LLP

(57) ABSTRACT

This invention relates to a device for protecting rechargeable power supply of electronic cigarette. Wherein such device comprises a rechargeable power supply module, a microcontroller, a semiconductor switch and an interface module configured to connect a charging unit. The interface module comprises a first charging terminal and a second charging terminal. The microcontroller comprises an input end and an output end. The power supply module is connected to the microcontroller and supplies electric power to it. The input end and the output end of the microcontroller is connected to the interface module and the semiconductor switch respectively, and the microcontroller detects a voltage signal of the first charging terminal, judges whether an electric level of the voltage signal is positive or negative and sends a control signal to the semiconductor switch for controlling the semiconductor switch to be ON or OFF.

13 Claims, 3 Drawing Sheets

DEVICE AND METHOD FOR PROTECTING RECHARGEABLE POWER SUPPLY OF ELECTRONIC CIGARETTE

CROSS-REFERENCE TO RELATED APPLICATIONS

This non-provisional application claims priority under 35 U.S.C. §119(a) on Patent Application No. 201310069937.X filed in P.R. China on Mar. 5, 2013, the entire contents of which are hereby incorporated by reference.

FIELD OF THE INVENTION

This invention relates to the field of electronic product, and particularly relates to a device and method for protecting rechargeable power supplies of electronic cigarettes.

BACKGROUND OF THE INVENTION

At present, in most of rechargeable electronic cigarettes, input interfaces and charging output interfaces share the same interfaces. A part of a rechargeable electronic cigarette has not any charging management device. When such a rechargeable electronic cigarette is being charged by an external charging unit, if a charging input section of the rechargeable electronic cigarette generates a short circuit or the input of the charging input section is suddenly withdrawn and changed to a load, a rechargeable battery in the rechargeable electronic cigarette may discharge. If the charging input section generates short circuit, the battery may be damaged, and may even cause a fire in severe cases. If the input of the charging input section is suddenly changed into a load, the rechargeable battery of the rechargeable electronic cigarette may keep discharging to the load until the power of the chargeable battery is exhausted. Both the two cases may damage rechargeable batteries and products using the rechargeable batteries.

SUMMARY OF THE INVENTION

Aiming at the drawbacks that a part of the electronic cigarettes in the prior art has inevitable defect that the electronic cigarette generates short circuit or discharge while being charged. A device and method for protecting a rechargeable power supply of an electronic cigarette is provided.

The technical proposal adopted in this invention is that supplies a device for protecting a rechargeable power supply of an electronic cigarette. Wherein the device for protecting a rechargeable power supply of an electronic cigarette includes: a rechargeable power supply module, a microcontroller, a semiconductor switch, and an interface module configured to connect a charging unit;

wherein the interface module comprises a first charging terminal and a second charging terminal, and the microcontroller comprises an input end and an output end;

wherein the power supply module is connected to the interface module and the semiconductor switch, and is further connected to the charging unit via the interface module to be charged by the charging unit;

wherein the power is connected to the microcontroller and supplies electric power to the microcontroller; and wherein the input end and the output end of the microcontroller is connected to the interface module and the semiconductor switch respectively, and the microcontroller detects a voltage signal of the first charging terminal, judges whether an electric level of the voltage signal is positive or negative and sends a control signal to the semiconductor switch for controlling the semiconductor switch to be ON or OFF.

The microcontroller comprises an A/D convertor, a judge module, and a control module;

the control signal comprises a breakage control signal and an breakover control signal;

the A/D convertor detects the voltage signal and converts the voltage signal to a digital signal;

the judge module is connected to the A/D convertor, and is configured to judge whether the electric level of the voltage signal is positive or negative and send a positive level signal or a negative level signal to the control module;

the control module sends the control signal to the semiconductor switch according to the positive level signal or the negative level signal;

wherein if the voltage signal is the negative level signal, the control signal is the breakover control signal which controls the semiconductor switch to be ON; and if the voltage signal is the positive level signal, the control signal is the breakage control signal which controls the semiconductor switch to be OFF.

The first charging terminal is configured to connect a cathode of the charging unit; and the second charging terminal is connected to an anode of the power supply module and further connects an anode of the charging unit.

The semiconductor switch is a MOSFET, a gate of the MOSFET is connected to the output end of the microcontroller.

The interface module further comprises a first resistor that is connected in parallel to the first charging terminal and the second charging terminal.

The microcontroller is a CPU, a GPU, a MCU or an ASIC chip.

A method for protecting a rechargeable power supply of an electronic cigarette while the interface module of the electronic cigarette is connected to a charging unit for charging, the method comprises these steps:

S1: a microcontroller detecting a voltage of a first charging terminal of the electronic cigarette;

S2: judging whether an electric level of the voltage is positive or negative; if the electric level is a negative level, executing S3; if the electric level is a positive level, executing S4;

S3: the microcontroller controlling a semiconductor switch of the electronic cigarette to be ON;

S4: the microcontroller controlling the semiconductor switch to be OFF.

The step S2 further comprises:

S21: converting the detected voltage to a digital signal;

S22: a judge module judging that the electric level is negative, executing S23; and when the judge module judging that the electric level is positive, executing S24;

S23: a control module sending a breakover control signal to the semiconductor switch;

S24: the control module sending a breakage control signal to the semiconductor switch.

the interface module further comprises a second charging terminal and a first resistor, and the first resistor is connected in parallel with the first charging terminal and the second charging terminal.

When the rechargeable power supply is being charged, a device and method for protecting a rechargeable power supply of an electronic cigarette disclosed by this invention can protect the rechargeable power supply well. Even when the charging interface generates short circuit or the input of the charging section changes into a load, the device and method also can protect the rechargeable power supply well. The device and method further can prevent the power supply from generating short circuit and discharging.

BRIEF DESCRIPTION OF THE DRAWINGS

Below this invention will be further explained with reference to the accompanying drawings and embodiments. In the figures.

DETAILED DESCRIPTION OF THE PREFERRED EMBODIMENT

Figure 1:
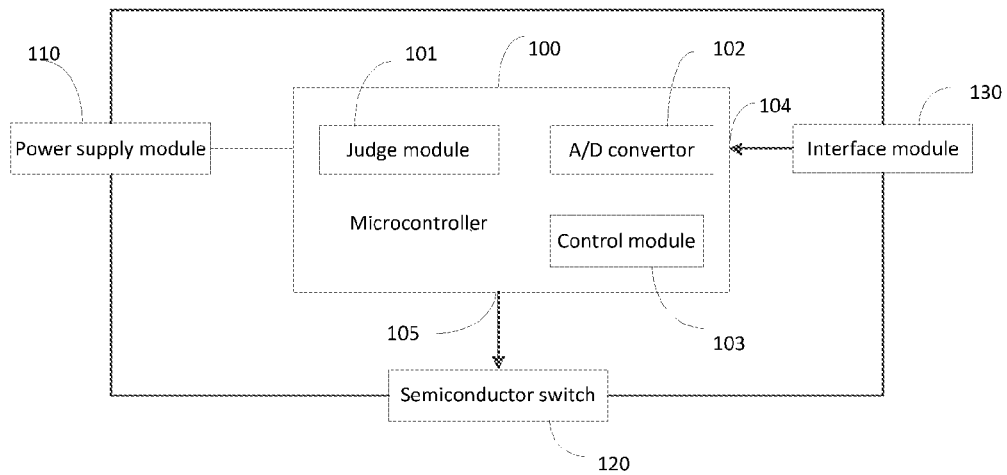
FIG. 1 is a functional block diagram of a device for protecting a rechargeable power supply of an electronic cigarette of the present invention.

In order to understand the technical features, purpose and the effect of the present invention more clearly, the specific embodiments of the present invention will be described referring to the drawings. It is understandable that the embodiments described herein is merely configured to explain the invention, not to limit the scope of the invention.

A device and method for protecting a rechargeable power supply of an electronic cigarette are provided in the invention. It is understandable that the following cases may occur during the process for charging the electronic cigarette.

One case: a charging circuit generates short circuit. It is understandable that a battery rod is screwed into the charging unit while the electronic cigarette is in a charging process, and the section of the battery rod that is screwed into the charging unit probably generates short circuit. Malfunctions of the charging unit and short circuits generated in the charging unit may also cause the charging circuit incorporated in the battery rod to generate short circuit. Thus, the power supply module may be damaged.

Another case: the charging circuit is connected to a load. The electronic cigarette includes a battery rod and an atomizer. The battery rod and the atomizer are in threaded connection to each other. When the battery received in the battery rod is being charged, if the charging circuit is connected to the atomizer, the atomizer becomes a load of the charging circuit. If the charging unit, the malfunction may make the charging unit be equivalent to a resistor, and may be further equivalent to a load when the charging unit is connected to the charging circuit. At the same time, it is understandable that the case that causes the charging circuit to generate short circuit and changes into the load is not limited by the above cases.

As shown in FIG. 1, the device for protecting a rechargeable power supply of an electronic cigarette provided in the invention comprises: a rechargeable power supply module 110, a microcontroller 100, a semiconductor switch 120, and an interface module 130 configured to connect a charging unit. The interface module 130 comprises a first charging terminal 131 and a second charging terminal 132. The microcontroller 100 comprises an input end 104 and an output end 105. The power supply module 110 is connected to the microcontroller 100 and supplies electric power for the microcontroller 100. The input end 104 and the output end 105 of the microcontroller 100 connected with the interface module 130 and the semiconductor switch 120 respectively. The microcontroller 100 detects a voltage signal of the first charging terminal 131, judges whether an electric level of the voltage signal is positive or negative and sends a control signal to the semiconductor switch 120 for controlling the semiconductor switch 120 to be ON or OFF The microcontroller 100 comprises an A/D convertor 102, a judge module 101, and a control module 103. The control signal comprises a breakage control signal and a breakover control signal. The breakage control signal is configured to control the semiconductor switch 120 to be OFF. The breakover control signal is configured to control the semiconductor switch 120 to be ON.

The A/D convertor 102 detects the voltage signal and converts an analogue signal to a digital signal. The judge module 101 is connected with the A/D convertor 102, and is configured to judge whether an electric level of the voltage signal is positive or negative and send a positive level or a negative level to the control module 103. The control module 103 sends a control signal to the semiconductor switch 120 according to the positive level signal or the negative level signal.

If the voltage signal is the negative level signal, the control signal is the breakover control signal that controls the semiconductor switch 120 to be ON. If the voltage signal is the positive level signal, the control signal is the breakage control signal that controls the semiconductor switch 120 to be OFF.

The microcontroller is a CPU, a GPU, a MCU or an ASIC chip. However, the type of the microcontroller is not limited by said kinds of the microcontroller.

Whether the charging unit and the load connected the charging interface generate short circuit or not can be determined by judging whether the electric level of the voltage for the first charging terminal 131 is positive or negative. Then the microcontroller 100 controls the semiconductor switch 120 to be ON or OFF to protect the power supply module.

The first charging terminal is configured to connect a cathode of the charging unit. The second charging terminal is configured to connect an anode of the charging unit.

In the present invention, the input end 104 of the microcontroller 100 is connected to the first charging terminal 131 and the second charging terminal 132 is connected to the anode of the supply power module. The input end 104 of the microcontroller is configured to detect the voltage signal.

In the present invention, the interface module 130 further comprises a first resistor 140; the first resistor 140 is connected in parallel with the first charging terminal 131 and the second charging terminal 132. Wherein such first resistor is configured for detecting the voltage of the input end of the microcontroller 100. It is understandable that the first resistor 140 may be other elements with resistance.

Figure 2:
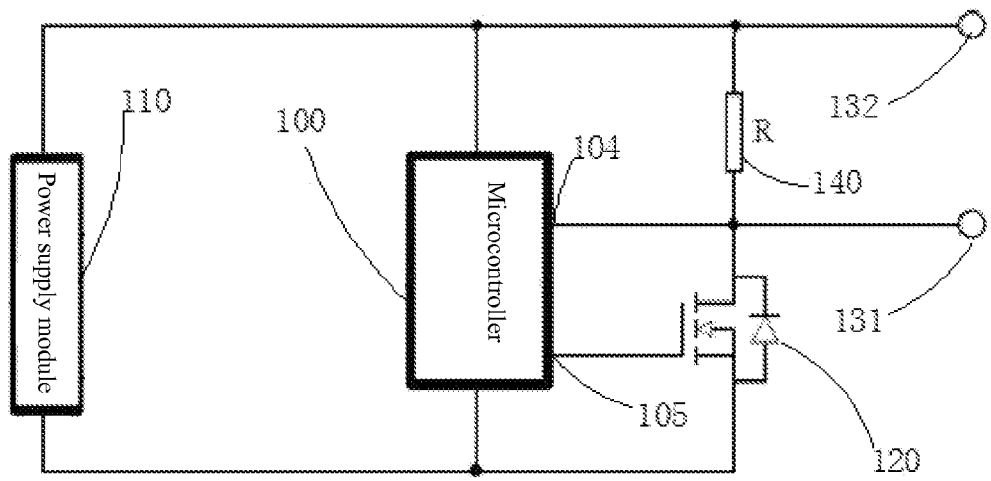
FIG. 2 is a circuit diagram of the device for protecting a rechargeable power supply of an electronic cigarette of the present invention.

By the circuit diagram of the invention as shown in FIG. 2, when the charging interface is hanged, the output end 105 of the microcontroller outputs nothing. The semiconductor switch is being OFF and the electric level of the input end 104 of the microcontroller is a relatively higher level (i.e., a positive level).

Figure 3:
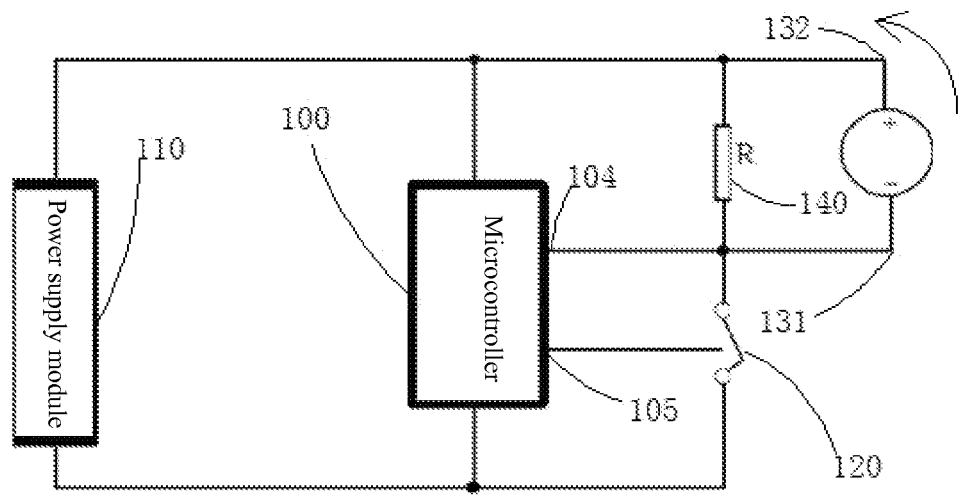
FIG. 3 is a schematic diagram of using the device for protecting a rechargeable power supply of an electronic cigarette of the present invention to charge.

When the charging interface connects the charging unit, the electric level of the input end 104 of the microcontroller is low level (negative level). As shown in FIG. 3, the first resistor 140 and the charging unit form a loop circuit. The input end 104 of the microcontroller 100 is connected to the first charging terminal 131 (connected to the cathode of the charging unit). In such case, the voltage detected by the input end 104 of the microcontroller 100 is indeed a voltage across the cathode of the charging unit. After the negative level is detected by the input end 104 of the microcontroller 100, the microcontroller 100 sends the breakover control signal to control the semiconductor switch 120 to be ON. At the same time, the charging circuit is breakover and the power supply module is being charged.

Figure 4:
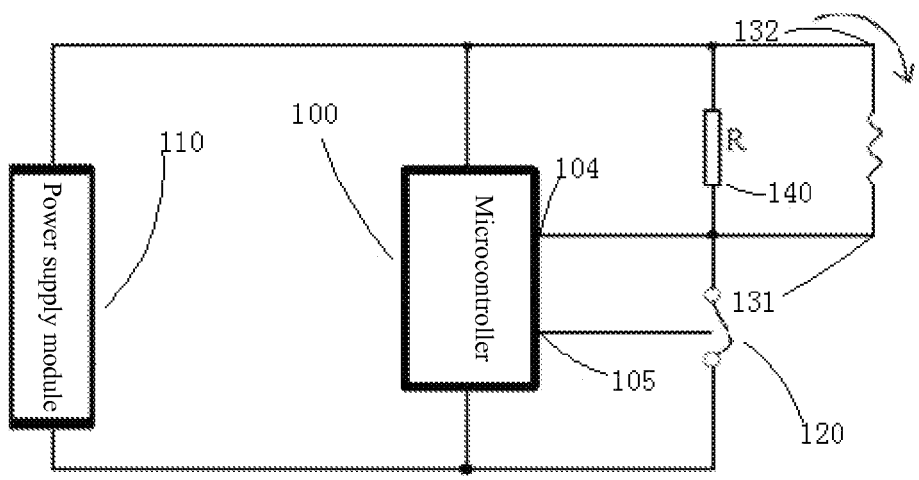
FIG. 4 is a schematic diagram of the device for protecting a rechargeable power supply of an electronic cigarette of the present invention, wherein a charging interface of the device shorts out or is connected to a load.
Figure 5:
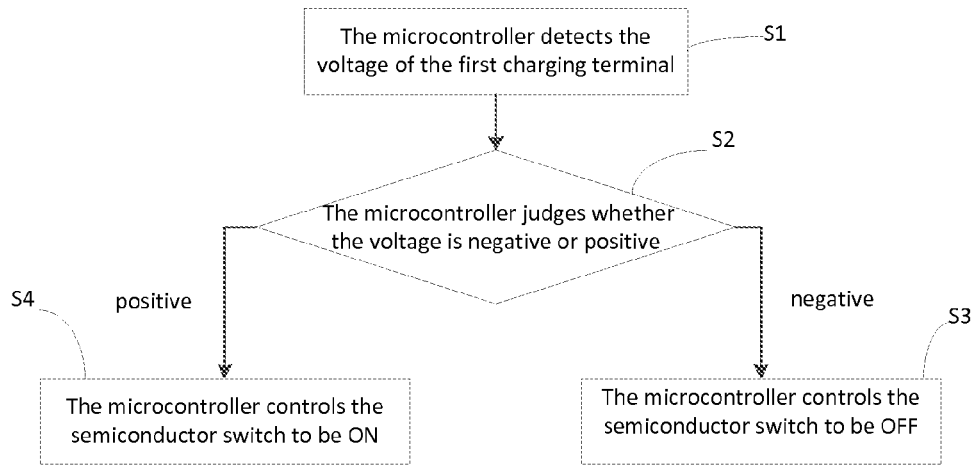
FIG. 5 is a flow chart of a method for protecting a rechargeable power supply of an electronic cigarette of the present invention.
Figure 6:
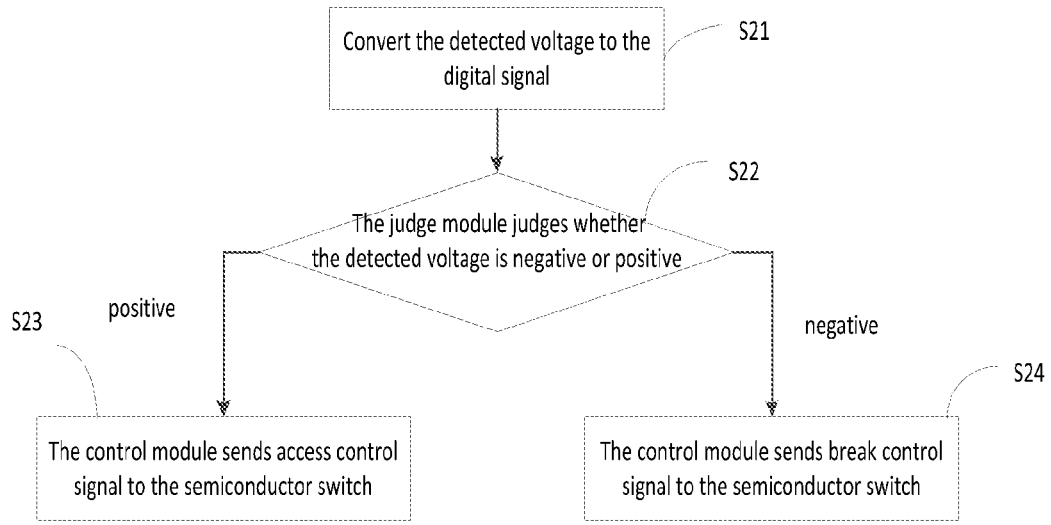
FIG. 6 is a flow chart of step S2 shown in FIG. 5.

As shown in FIG. 4, when the charging interface generates short circuit or is connected to the load, and when the charging circuit is broken, the voltage detected by the input end 104 of the microcontroller 100 as above is indeed a voltage across the anode of the power supply module 110. The detected voltage is a positive level, and the charge circuit has been broken yet.

When the charging interface generates short circuit or is connected to the load, and when the charging circuit is turned on, the semiconductor switch 120 is closed yet in this moment. At the same time, the power supply module 110 supplies the electric power for the load (e.g., a resistor or other elements with resistance). The current flows backward via the semiconductor switch 120 and the electric level of the voltage detected by the input end of the microcontroller 100 changes. The detected voltage changes into the positive level from the negative level with respect to charging. The input end 104 of the microcontroller sends the positive signal to the microcontroller 100. The microcontroller 100 sends the breakage control signal to control the semiconductor switch 120 to be OFF to prevent the power supply module 110 from discharging.

A reference voltage value is preset in the microcontroller 100 (in the judge module). The value of the detected voltage is compared with the reference voltage value. If the value of the detected voltage is greater than the reference voltage value, the detected voltage is positive level. If the value of the detected voltage is less than the reference voltage value, the detected voltage is negative level.

Preferably, the reference voltage value in the invention is a value of the voltage across the semiconductor switch 120 that is being on while charging.

Further, if the detected voltage is negative level, the judge module 101 drives the control module 103 to apply a breakover voltage for the semiconductor switch 120 to control the semiconductor switch 120 to be ON. If the detected voltage is in a positive level and the semiconductor switch 120 is being ON, the judge module 101 drives the control module 103 to apply a backward voltage of the breakover voltage for the semiconductor switch 120 to control the semiconductor switch 120 to be OFF.

Preferably, the semiconductor switch 120 is a MOSFET. A gate of the MOSFET is connected to the output end 105 of the microcontroller 100. It is understandable that the type of the MOSFET is not limited. The MOSFET may be N channel MOSFET or P channel MOSFET.

When the MOSFET is an N channel MOSFET, the breakover voltage provided by the control module 103 is greater than Ugs. When the MOSFET is a P channel MOSFET, the breakover voltage provided by the control module 103 is less than −Ugs.

In conclusion, the device for protecting a rechargeable power supply of an electronic cigarette provided in the invention can prevent the rechargeable power supply module from generating shorting circuit or discharging.

A method for protecting a rechargeable power supply of an electronic cigarette is further provided in the invention. While the interface module connects a charging unit for charging, the method comprises these steps:

S1: the microcontroller 100 detecting a voltage of the first charging terminal 131 of the electronic cigarette;

S2: judging whether the electric level of the voltage is positive or negative; if the electric level is a negative level, executing S3; if the electric level is a positive level, executing S4;

S3: the microcontroller 100 controlling a semiconductor switch 120 of the electronic cigarette to be ON;

S4: the microcontroller 100 controlling the semiconductor switch 120 to be OFF.

The step S2 further comprises:

S21: converting the detected voltage to a digital signal;

S22: when a judge module 101 judging that the electric level is negative, executing S23; when the judge module 101 judging that the electric level is positive, executing S24;

S23: a control module 103 sending a breakover control signal to the semiconductor switch 120;

S24: the control module 103 sending a breakage control signal to the semiconductor switch 120.

In the step S22, the reference voltage value is preset in the judge module. If the value of the detected voltage is greater than the reference voltage value, the detected voltage is a positive level. If the value of the detected voltage is less than the reference voltage value, the detected voltage is a negative level.

The interface module 130 further comprises a second charging terminal 132 and a first resistor 140. The first resistor 140 is connected in parallel with the first charging terminal 131 and the second charging terminal 132.

While the present invention has been described with reference to preferred embodiments, it will be understood by those skilled in the art that various changes may be made and equivalents may be substituted without departing from the scope of the present invention. However, all the changes will be included within the scope of the appended claims.

The invention claimed is:

1. A device for protecting a rechargeable power supply of an electronic cigarette, characterized in that the device comprises: a rechargeable power supply module, a microcontroller, a semiconductor switch, and an interface module configured to connect a charging unit;
    wherein the interface module comprises a first charging terminal and a second charging terminal, and the microcontroller comprising an input end and an output end;
    wherein the power supply module is connected to the interface module and the semiconductor switch, and is further connected to the charging unit via the interface module to be charged by the charging unit;
    wherein the power supply module is connected with the microcontroller and supplies electric power to the microcontroller by; and
    wherein the input end and the output end of the microcontroller is connected with the interface module and the semiconductor switch respectively, and the microcontroller detects a voltage signal of the first charging terminal, judges whether an electric level of the voltage signal is positive or negative and sends a control signal to the semiconductor switch for controlling the semiconductor switch to be ON or OFF;
    wherein when the interface module connects the charging unit, the microcontroller sends a control signal to the semiconductor switch for controlling the semiconductor switch to be ON and the rechargeable power supply module is being charged;
    wherein when the interface module generates short circuit or is connected to a load, the microcontroller sends a control signal to the semiconductor switch for controlling the semiconductor switch to be OFF.

2. The device according to claim 1, characterized in that:
the microcontroller comprises an A/D convertor, a judge module, and a control module;
the control signal comprises a breakage control signal and an breakover control signal;
the A/D convertor detects the voltage signal and converts the voltage signal to a digital signal;
the judge module is connected to the A/D convertor, and is configured to judge whether the electric level of the voltage signal is positive or negative and send a positive level signal or a negative level signal to the control module;
the control module sends the control signal to the semiconductor switch according to the positive level signal or the negative level signal;
wherein if the voltage signal is the negative level signal, the control signal is the breakover control signal which controls the semiconductor switch to be ON; and if the voltage signal is the positive level signal, the control signal is the breakage control signal which controls the semiconductor switch to be OFF.

3. The device according to claim 2, characterized in that the first charging terminal is configured to connect an cathode of the charging unit; and the second charging terminal is configured to connect an anode of the power supply module and further connect an anode of the charging unit.

4. The device according to claim 3, characterized in that the semiconductor switch is a MOSFET, and a gate of semiconductor switch is connected to the output end of the microcontroller.

5. The device according to claim 4, characterized in that the interface module further comprises a first resistor that is connected in parallel with the first charging terminal and the second charging terminal and is configured for detecting the voltage of the input end of the microcontroller,
wherein when the interface module connects the charging unit, the first resistor and the charging unit form a loop circuit, the input end of the microcontroller is connected to the first charging terminal, the electric level of the input end of the microcontroller is low level, the microcontroller sends the break over control signal to control the semiconductor switch to be ON, and the charging circuit is break over and the power supply module is being charged.

6. The device according to claim 1, characterized in that the microcontroller is a CPU, a GPU, a MCU or an ASIC chip.

7. The device according to claim 2, characterized in that the microcontroller is a CPU, a GPU, a MCU or an ASIC chip.

8. The device according to claim 3, characterized in that the microcontroller is a CPU, a GPU, a MCU or an ASIC chip.

9. The device according to claim 4, characterized in that the microcontroller is a CPU, a GPU, a MCU or an ASIC chip.

10. The device according to claim 5, characterized in that the microcontroller is a CPU, a GPU, a MCU or an ASIC chip.

11. A method for protecting a rechargeable power supply of an electronic cigarette while an interface module connects a charging unit for charging, characterized in that comprises these steps:
S1: a microcontroller detecting a voltage of a first charging terminal of the electronic cigarette;
S2: judging whether an electric level of the detected voltage is positive or negative; if the electric level is a negative level, executing S3; if the electric level is a positive level, executing S4;
S3: the microcontroller controlling a semiconductor switch of the electronic cigarette to be ON;
S4: the microcontroller controlling the semiconductor switch to be OFF,
wherein when the interface module connects the charging unit, the microcontroller sends a control signal to the semiconductor switch for controlling the semiconductor switch to be ON and the rechargeable power supply module is being charged;
wherein when the interface module generates short circuit or is connected to a load, the microcontroller sends a control signal to the semiconductor switch for controlling the semiconductor switch to be OFF.

12. The method according to claim 11, characterized in that the step S2 further comprises:
S21: converting the detected voltage to a digital signal;
S22: when a judge module judging that the electric level is negative, executing S23; when a judge module judging that the electric level is positive, executing S24;
S23: a control module sending a breakover control signal to the semiconductor switch;
S24: the control module sending a breakage control signal to the semiconductor switch.

13. The method according to claim 12, characterized in that the interface module further comprises a second charging internal and a first resistor ,and the first resistor is connected in parallel with the first charging terminal and the second charging terminal and is configured for detecting the voltage of the input end of the microcontroller,
wherein when the interface module connects the charging unit, the first resistor and the charging unit form a loop circuit, the input end of the microcontroller is connected to the first charging terminal, the electric level of the input end of the microcontroller is low level, the microcontroller sends the break over control signal to control the semiconductor switch to be ON, and the charging circuit is break over and the power supply module is being charged.

* * * * *